March 20, 1962      S. GRAY      3,026,501
WEATHER DISPLAY AND FORECASTING SYSTEM
Filed Dec. 31, 1957      2 Sheets-Sheet 1

INVENTOR.
SIDNEY GRAY
BY
ATTORNEY

March 20, 1962 S. GRAY 3,026,501
WEATHER DISPLAY AND FORECASTING SYSTEM
Filed Dec. 31, 1957 2 Sheets-Sheet 2

INVENTOR.
SIDNEY GRAY
BY
ATTORNEY

United States Patent Office 3,026,501
Patented Mar. 20, 1962

3,026,501
WEATHER DISPLAY AND FORECASTING SYSTEM
Sidney Gray, Somerville, N.J., assignor to Radio Corporation of America, a corporation of Delaware
Filed Dec. 31, 1957, Ser. No. 706,451
13 Claims. (Cl. 340—182)

The present invention relates in general to improved weather display and forecasting systems and to a display device which is especially useful in such systems.

A conventional weather map, known as a synoptic chart, consists of a series of contour lines drawn on a map of a geographical area. Each line represents a given atmospheric pressure reading and is known as an isobar. The chart is prepared by marking on a map the pressure readings received from various weather stations in the map area, and joining the points of equal pressure. To maintain the synoptic chart current, it must be periodically redrawn in view of the fact that weather conditions continuously change. This preparation and correction of synoptic charts is relatively expensive and time consuming.

Knowing the pressure readings in a geographic area and the forces at the various points in the area due to the earth's rotation, it is possible to make forecasts of future pressure patterns. The prediction procedure may be very complicated and tedious. In one such procedure, a grid is placed over the map and the point-to-point pressure readings in two directions noted. The partial derivatives of the pressure readings must be taken, a procedure which is very time consuming. The derivative information and certain other information must then be applied to a computer in order to solve the weather forecasting equations which are discussed in more detail later. The entire prediction process is, in general, expensive, and time consuming.

An object of the present invention is to provide an improved system for automatically displaying data such as weather data.

Another object of the invention is to provide a weather display system which is automatically corrected in response to changes in the weather at the various weather stations from which the weather data is received.

Another object of the invention is to provide an improved panel type display system on which barometric pressure data or other data received from different points in an area of interest may be displayed in the form of a visual presentation of varying light intensity.

Yet another object of the invention is to provide an improved weather forecasting system.

A weather system, according to this invention, includes a plurality of geographically spaced weather stations, each for transmitting data indicative of a weather parameter at its location. For example, each station may transmit a coded teletype signal or one having a parameter (frequency, phase, amplitude, etc.) the magnitude of which is indicative of the pressure reading at that station. The data is received at a single location and automatically displayed in synoptic chart like form. The display responds to changes in the received data and automatically corrects the chart in response to such changes.

In a preferred form of the invention, the display means comprises an electroluminescent panel having a semiconductor layer, and spaced conductive terminals on a surface of this layer in positions corresponding to those of the weather stations. The data from the stations is converted to analog voltages representative of the barometric pressure readings at the stations, and applied to the respective terminals. These voltages develop electrostatic voltage gradients along a surface of the semiconductor layer which closely correspond to the barometric pressure gradients among the weather stations. A grounded, transparent conductor layer and an electroluminescent layer positioned between the conductor layer and the semiconductor layer complete the display panel. The electric field between the semiconductor layer and the conductor layer excites the electroluminescent layer, inducing luminescence. Thus the voltage patterns on the semiconductor appear as light patterns and points on the electroluminescent layer of the same light intensity correspond to isobars on the conventional black line synoptic chart. A transparent map may be placed over the conductor layer.

In a form of the invention which is useful for weather forecasting, a portion of the panel type display described above is incorporated as the target of a cathode ray tube similar in some respects to a vidicon. The semiconductor layer forms the target of the tube and is scanned by the electron beam of the tube. Terminals on this layer are spaced in the manner previously described and received analog voltages of the barometric pressure readings at the weather stations. Thus, a pattern of voltage analogous to that of the pressures in the area develops along the surface of the semiconductor layer (target) toward which the beam is directed. In one method of tube operation, the beam strikes the target and the amount of electron beam current it deposits is a function of the voltage of the semiconductive layer at the point struck by the electron beam. In another method of tube operation, the beam is biased to a value such that it closely approaches but does not strike the target. Here the nearness of such approach depends on the target voltage. This nearness of approach can be capacitively detected. In either method, however, an output signal is obtained from the tube target the amplitude of which varies in accordance with the barometric pressure readings in the area of interest. For direct display, the signal may be applied to intensity modulate the beam of a conventional cathode ray tube indicator. The signal may also be applied to circuits which obtain the partial derivatives of the barometric pressure readings. The derivatives may be stored, then scanned and applied to a computer. Information concerning the latitudes from which the weather information is received is also applied to the computer for computation of the "Coriolis" force-another parameter required to compute the forecast.

The invention will be described in greater detail by reference to the following description taken in connection with the accompanying drawing in which.

Figure 1:
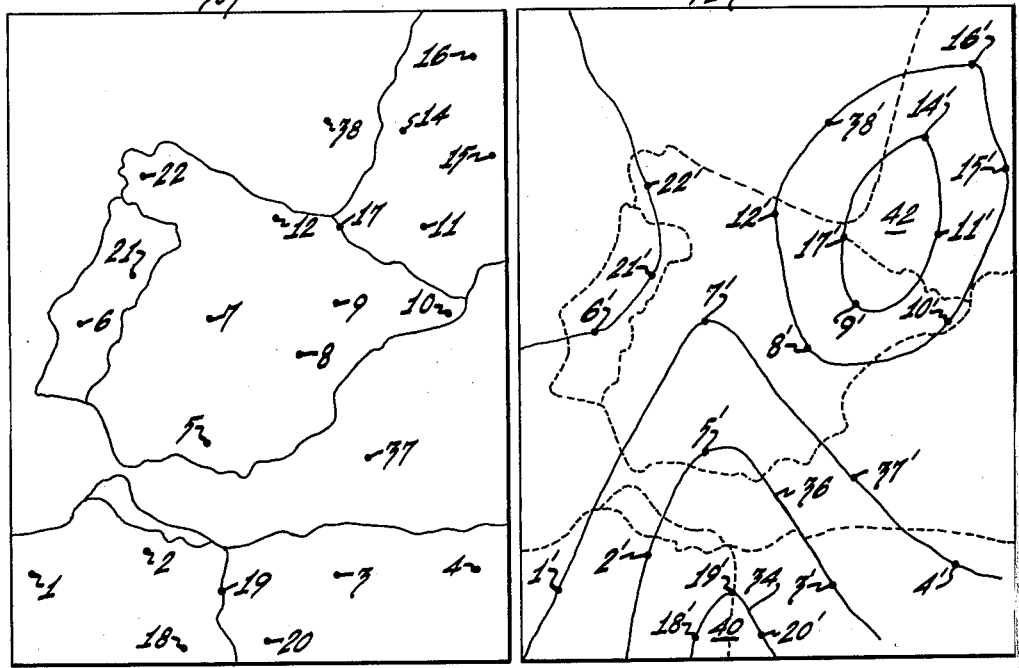
FIG. 1 is a diagram showing a geographical area and a weather map presentation which is useful in explaining how the system of this invention operates.

Referring to FIG. 1, the area within block 30 is a map of a geographical subdivision for which it is desired to display weather information. The points numbered 1–22 on the map correspond to weather transmitting stations. Each station may make use of, for example, a radiosonde—an instrument carried aloft by a balloon which includes an aneroid barometer for sensing the atmospheric pressure and a transmitter for transmitting a signal having a parameter indicative of this pressure. Radiosonde equipment is described in the volume of "Meteorological Instruments" by Knowles-Middleton at pages 196–201. For the purposes of the present discussion, it may be assumed that the transmission from each station corresponds to a pressure reading at the same altitude. Alternatively, the transmission may indicate the altitude at which a given pressure reading occurs. The latter facilitates the weather forecast computations to be described later.

Block 32 is a panel type display at a single location. Drawn on the panel in dashed line is a map corresponding to the geographical subdivision shown in block 30. The points 1'–22' on the map correspond in position to the like numbered points in the geographical subdivision. In practice, there may be many more points than are shown from which weather data is transmitted and in such case, there will be a correspondingly larger number of points on the panel type display 32.

In operation, the barometric pressure data transmitted from stations 1–22 are received at a single location, are decoded, and converted to analog voltages having amplitudes corresponding to the various pressure readings. The voltage corresponding to each transmitting point is impressed on a corresponding point in the panel type display 32. The construction of the display is discussed later. However, in operation, the analog voltages applied to the various points in the display establish voltage gradients between the points in accordance with the Laplace equation. These voltage gradients are converted by means to be described later to corresponding light gradients. The lines 34, 36 etc., shown on the map, known as "isopleths," do not actually appear on the map but are merely shown for purposes of illustration. Instead, such lines appear as light illuminations of given intensities. Thus, for example, isopleth 34 may be the center of a light band of one intensity and isopleth 36 of another, higher intensity. In the map, area 40 represents a low pressure area and it is the darkest portion of the map. Area 42 represents a high pressure area and it is the lightest area on the map.

Figure 2:
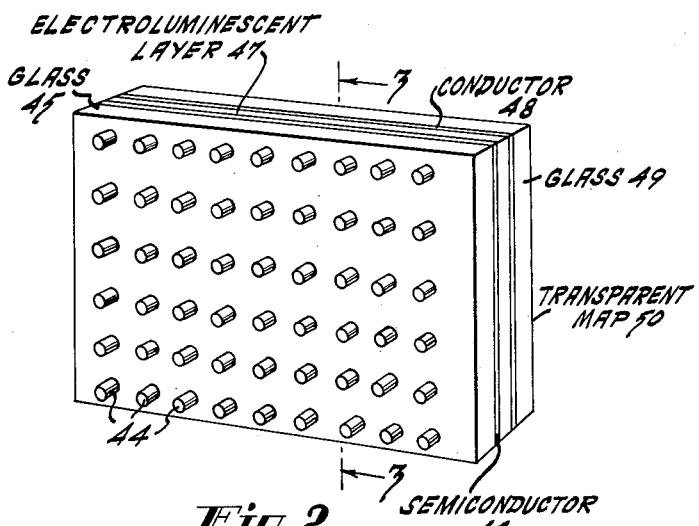
FIG. 2 is a perspective view of the panel type display shown schematically in FIG. 1.
Figure 3:
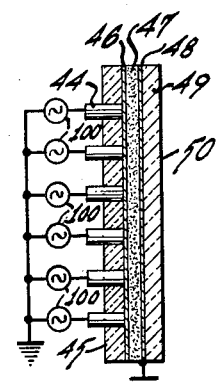
FIG. 3 is a cross-section along line 3—3 of FIG. 2.

The display panel shown at 32 in FIG. 1 is illustrated in more detail in FIGS. 2 and 3. It includes a backing member such as glass plate 45 or other transparent insulating layer on which a thin layer 46 of semiconductor material is formed. The term "semiconductor," as used here, refers to a layer of moderately low conductivity. The layer may be formed of a material which has a resistivity higher than that of a metal and lower than that of an insulator—that is, a semiconductor in the usual physical sense, or it may be formed of a very thin metal layer, as described in more detail later. A plurality of conductive terminals extend through the glass and make electrical contact with the semiconductor layer 46. In cases in which the weather data transmitting stations are moving vessels or aircraft, for example, it is desirable to have a large number of points equally spaced from one another, as illustrated, so that the weather data may be applied to points in the display which correspond most closely with the locations of the moving stations. However, in cases in which the weather data transmitting stations are fixed, the terminals are not equally spaced from one another but correspond in position to the positions of the weather stations.

Adjacent to the semiconductor layer 46 is an electroluminescent layer 47. A transparent conductor layer 48 is located on the other side of the electroluminescent layer. Although not essential, a second glass plate 49 may be placed over the transparent conductor layer 48. Finally, a transparent map 50 is ordinarily permanently secured to the glass plate 49. Only an edge of the map can be seen in FIGS. 2 and 3.

There are numerous materials of which the panel just described may be made. As examples, glass plate 45 may be formed of Pyrex glass about ¼ inch thick. The semiconductor layer may be formed of tin oxide, indium oxide or a very thin layer of a metal such as chromium.

Electroluminescent layer 47 may be formed of a phosphor such as zinc selenide activated by copper or the like, or copper activated zinc sulfide, or copper activated sulfoselenide. The phosphor is imbedded in an appropriate light permeable dielectric material as a plastic, like ethyl cellulose or polystyrene, a lacquer, a wax or one of a number of different types of matrix materials. The conductor layer 48 may include tin oxide or other metallic compounds. They may be formed, for example, by exposing the electroluminescent layer to vapors of silicon chloride, tin chloride or titanium chlorides and then placing the heated, coated electroluminescent layer in a slightly reducing atmosphere. The resulting layer appears to contain the metal oxide (silicic, stannic, or titanic), probably to some extent at least, reduced to a form lower than the dioxide, although the exact composition is not fully known. Note that the thicknesses of the various layers are not drawn to scale in the figure.

A typical method by which the panel of FIGS. 2 or 3 may be made is as follows. First, holes are drilled in the glass plate 45 at the required locations, preferably ultrasonically. The conductive terminals 44 are then imbedded and sealed in the holes in such manner that they extend out of both surfaces of the glass plate. One of the surfaces of the plate is then ground and polished so that the conductive terminals are flush with that surface. The semiconductor layer is then applied by evaporation in a vacuum or, in the case of the oxides mentioned above, by spraying, for example. The thickness of the semiconductor layer depends on its resistivity per square and may be on the order of from several hundred to several thousand angstroms. The resistance desired may be on the order of 100,000 ohms per square. However, this depends in each case on the applied voltages and the relative resistance of the semiconductor and electroluminescent layers.

The electroluminescent layer is next deposited on the semiconductor layer. This may be done by standard techniques to a thickness of on the order of 10 mils or so. The method of applying the conductor layer 48 on the electroluminescent layer has already been described. Its thickness may be about 1 mil or whatever is required to produce good conductivity. The glass plate 49 may merely be placed over the assembly described in order to protect the relatively thin surface of conductor 48. This last glass plate is not an essential component of the panel.

The resistivity of the electroluminescent layer is high on the order of $10^{12}$ ohm-centimeter. This is substantially higher than the resistivity of the semiconductor layer and is advantageous as it prevents deterioration or deformation of the voltage patterns present on the semiconductor. In operation, the transparent conductor is normally grounded, as shown in FIG. 3.

The light panel operates in the following manner. When A.C. voltages are applied to the various terminals, as indicated schematically by the generators 100 connected to the terminals, voltage gradients are established along a surface of the semiconductor layer in accordance with the Laplace equation. These gradients are analogous to those described in connection with the mapping of electrostatic fields, in the volume "Electron Optics" by the Research Staff of EMI, Ltd. at pages 16–19. The voltages across the electroluminescent material, established by the A.C. voltages between the semiconductor layer and the conductor layer 48, appear as light patterns in the electroluminescent layer. The light patterns ("isopleths") may be viewed through the transparent conductor layer 48 and the glass plate 49.

Figure 4:
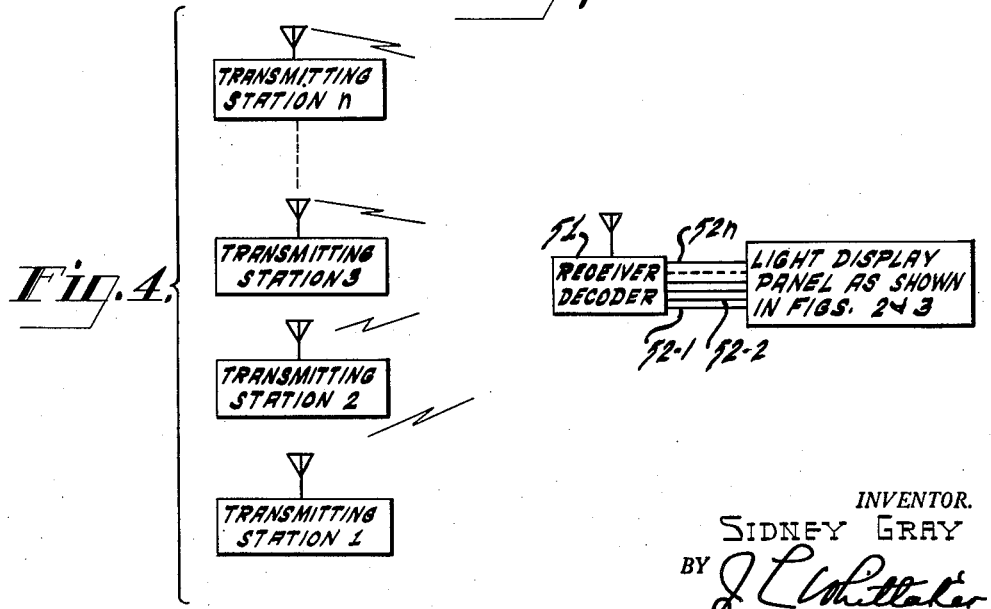
FIG. 4 is a block circuit diagram of a weather display system according to this invention.

The enitre weather system is illustrated briefly in FIG. 4. The weather data transmitting stations are shown in block form at the left of the figure. The barometric pressure information transmitted is received at the display location by a receiver-decoder unit 51. The link between the transmitter and receiver stations may be by radio, as shown, or by wire. The transmission from each transmitting station must be identified by a characteristic which is individual to that station. As an example, the stations may transmit a teletype signal the first several digits of which identify the station. Or, the stations may transmit on different carrier frequencies or in predetermined time sequence.

At the receiver, barometric pressure information which may appear as a modulation on a received carrier wave is detected by conventional means and, in the case of the specific display means shown, converted to an alternating voltage having an amplitude proportional to the barometric pressure reading. In the case in which the various weather transmissions are at different carrier frequencies, they may be segregated from one another prior to being converted to alternating voltages by means of band pass filters, for example. The means for converting the filtered voltages to alternating voltages are conventional. The alternating voltages, also known as analog voltages, are applied to the conductive plugs in the electroluminescent panel via leads 52–1 through 52–n. The panel has already been described in detail.

Figure 5:
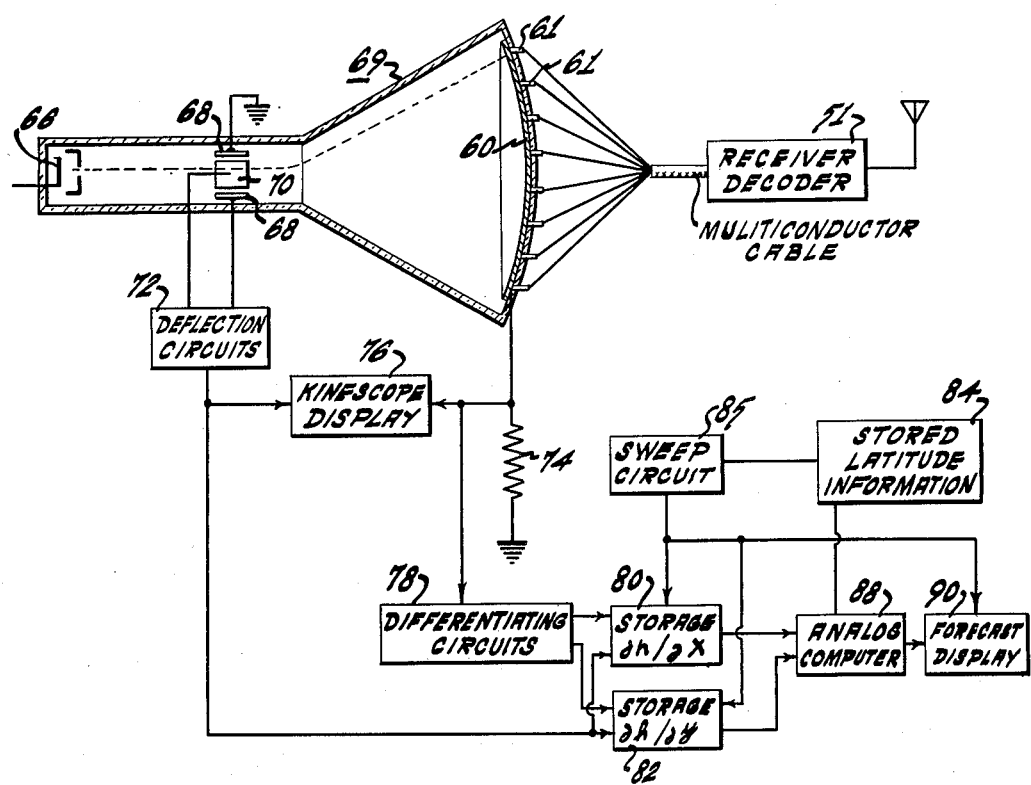
FIG. 5 is a block and schematic circuit diagram of a weather forecasting system according to the present invention.

A weather forecasting and display system according to the present invention is shown in FIGURE 5. A semiconductor layer 60 analogous to the one illustrated in FIGURES 2 and 3, is incorporated as the target of a low beam velocity cathode ray tube. Layer 60 appears inside the glass envelope and the conductive terminals 62 extend through the glass envelope and make contact with the semiconductor layer. The electroluminescent layer is not included. Receiver-decoder 51 is analogous to the like numbered element shown in FIG. 4 and it applies D.C. analog voltages corresponding to barometric pressure readings to the terminals. (Note that in this embodiment, D.C. rather than A.C. analog voltages are called for.) In this manner, a D.C. voltage pattern is established on the target.

Cathode ray tube 64 is, aside from the modification just described, of standard type. It includes an electron gun shown schematically at 66, electron beam focusing and accelerating means (not shown) and electron beam deflecting means shown schematically as vertical and horizontal electrostatic deflecting plates 68 and 70. It will be appreciated that magnetic deflection coils may be and preferably are used instead of the electrostatic deflection plates.

In one form of the invention the tube voltages are such that the electron beam strikes the target 60. The amount of electron current deposited in the target, at a particular time, depends upon the D.C. voltage of the target element then being scanned. This beam current may be read off across load resistor 74 and will appear as a video signal, the amplitude of which varies with time.

In another form of the invention, the tube voltages are such that the beam never strikes the target. However, here the closeness of approach of the beam affects the capacitance between the beam and target and this, in turn, affects the amplitude of the video signal. The closeness of beam approach to the target depends, of course, on the D.C. voltage of the elemental target area being scanned at that time. In both this embodiment and the one previously described the output signal is a video signal appearing across resistor 74 and its amplitude varies with time.

In a form of the invention in which it is desired to view the video signal taken from across resistor 74 directly, deflection circuits 72 may be of standard type. As an example, the deflection circuits may be such that they deflect the beam horizontally at a relatively rapid rate and vertically at a much slower rate, similarly to the deflection circuits in television. The direct viewing means, shown as block 76 connected both to the deflection circuits and the load resistor 74, may be a conventional kinescope, a storage tube, or other type of display. In the case of the conventional or storage types of cathode ray displays, the video signal may be applied to intensity modulate the electron beam, and the deflection voltage may be applied to the tube deflecting elements.

In a form of the invention useful for weather forecasting purposes it is necessary to obtain the partial derivatives in two directions of the barometric pressure readings. This requires the deflection circuits 72 to scan the beam in a somewhat different fashion than the one described above. Rather than scanning only in normal television fashion, that is with only fast horizontal and slow vertical sweeps, the beam must scan first with fast horizontal and slow vertical sweeps and then with fast vertical and slow horizontal sweeps. Conventional sweep circuits may be used. Switches may be employed for connecting first the horizontal and then the vertical deflection plates to the fast sweep circuit, and simultaneously, first the vertical and then the horizontal deflection plates to the slow sweep circuits. The switches may be manual and ganged or they may be automatic (electronic, in nature).

The time varying video signal obtained for the two directions of scan described above correspond to the barometric pressure readings in two directions, say North-South and East-West, for example. These are applied to differentiating circuits 78, of conventional type, to obtain the partial derivatives of the barometric pressure readings in these two directions. The partial derivative signals are applied to the storage devices 80 and 82, one of which stores the partial derivatives for one direction of scan, and the other of which stores the partial derivatives the other direction of scan. Storage circuits 80 and 82 may comprise tubes and the partial derivative signals may be written on the storage targets of the storage tubes by deflecting their writing beams in accordance with the sweep voltages generated in stage 72. The differentiating circuits 78 are switched from one storage stage to the other by a switch ganged with the switch in the deflection circuits 72. As already mentioned, these switches may be manual if desired or automatic (electronic, in nature). In the latter case, the switches are driven by the same wave that drives the one in stage 72. The switches for the storage tubes are not separately illustrated but appear in stage 78.

In order to read out the stored, partial derivative information for the two directions of scan and to simultaneously apply this information to the analog computer 88, it is necessary to deflect the reading beams of the two storage tubes in synchronism. A separate sweep circuit 85 accomplishes this. The sweep circuit need not be synchronized with the deflection circuits 72 and it can be manually or automatically actuated. The sweep circuit, of course, is made to function after the partial derivative information has been obtained and stored in the storage tubes.

In order to compute the barometric pressure readings expected at a future time, it is necessary to take into account the Coriolis parameter. This parameter is indicative of the forces due to the earth's rotation and it depends upon the earth's latitude and the barometric pressure reading at that latitude. Since the earth's latitude is a constant it can be permanently tsored on a cathode ray tube indicator of the type shown at 69 in FIGURE 5. Block 84 represents such a cathode ray tube indicator on which the latitude information has been stored. The stored information is read out of the cathode ray tube indicator by deflecting the cathode ray beam thereof in accordance with the sweep voltage developed in stage 85. Thus, the stored latitude information is applied to analog computer 88 simultaneously with the partial derivative information from stages 80 and 82. The analog computer therefore can compute the Coriolis parameter discussed above.

It is known that if the partial derivatives in two directions of the barometric pressure readings at various points in an area are known and the Coriolis parameter at the various points are known, equations can be set up, which, when solved, provide a forecast of the pressure pattern to be expected within a given time, and therefore, of the weather. In some computations, rather than using different barometric pressure readings at the same altitude, the information applied to the computer consists of the altitudes at the various recording locations at which a predetermined pressure reading is obtained. A computation procedure of the latter type is described in an article appearing in the "Journal of Meteorology" by Charney et al., October 1956, volume 13, starting on page 489. The equation set forth in the article takes into account the partial derivatives of three different altitudes at which three given barometric pressure readings are obtained. For the sake of illustration, it can be assumed that the information applied by receiver-decoder 51 to the conductive terminals 61 consists of the different altitudes at which a single, predetermined barometric pressure reading is obtained at the different weather stations. It is evident that with three systems of the type shown in FIGURE 5, each supplying information to the analog computer, and each receiving information corresponding to a different, predetermined barometric pressure reading, a forecasting arrangement precisely analogous to the article can be synthesized.

As already implied, analog computer 88 of FIGURE 5 sets up and solves weather equations similar to those described in the article. The output of the analog computer consists of a time-varying voltage indicative of barometric pressure readings at some future time. This may be displayed on a conventional kinescope or on an arrangement which includes circuits analogous to 72, 76 and 69 shown in FIGURE 5. The display means is shown generically in FIGURE 5 at 90. The electron beam sweep may be derived from sweep circuit 85.

As is understood by those skilled in this art, weather forecasts are usually done step-wise in time. In other words, a one hour forecast may first be made and this forecast used to compute a new forecast one hour beyond the first forecast etc., etc. This technique may be employed with the present invention. If it is, block 90 might represent another system similar to the one of FIGURE 5, etc.

What is claimed is:
1. In a system in which geographically spaced transmitter means transmit data indicative of a weather parameter at the different transmitter locations, an arrangement for displaying said data comprising, in combination, a display panel having spaced points thereon corresponding in location to the locations of the transmitter means, and responsive to actuation of each spaced point for producing an illumination adjacent that point having an intensity gradient dependent on the extent of said actuation; and means for receiving the weather data transmitted from the respective transmitter means and actuating the corresponding spaced points in accordance therewith.

2. In a system in which like values of a given parameter appear on imaginary curves which extend through an area of interest, means at spaced points in said area for sensing the value of said parameter at said spaced points; a display device including a layer of semiconductive material; means responsive to the parameter sensed at said spaced points for developing continuous voltage gradients along a surface of said layer corresponding to the gradients of said parameter within said area of interest; and a voltage-responsive, light-emitting layer positioned on said surface, whereby the continuous voltage gradients developed at said surface produce curves of equal light intensity on said light-emitting layer corresponding to said imaginary curves.

3. A display device as set forth in claim 2 in which said light-emitting layer comprises an electroluminescent layer positioned on said surface.

4. A display device comprising, a layer of a substance of the type which develops continuous voltage gradients along the surface thereof in response to voltages applied to spaced points thereon; means for applying voltages corresponding to elements of a display to said points on said layer; means producing an electron beam for scanning said surface, whereby the charge deposited by said beam on said surface is a function of the voltage present at the point struck by the beam; means for sensing the charge deposited by said electron beam as it scans said surface; and a display device responsive to the charge sensed by the last-named means for converting the same to an area type display in which light gradients correspond in position and intensity to the voltage gradients on said surface of said substance.

5. A display device as set forth in claim 4 in which the last-named means comprises a cathode ray tube indicator, the charge sensed by said sensing means being applied to intensity modulate the electron beam of said cathode ray tube indicator.

6. In a weather forecasting system, a substance of the type which develops voltage gradients along a surface thereof in accordance with voltages applied to spaced points thereon; means for developing voltage gradients on said surface in accordance with given weather parameter readings in a geographical area; means for scanning said surface to obtain a time varying signal indicative of the amplitude of said parameter, point-to-point; and means for differentiating said time varying signal.

7. In a weather forecasting system, a substance of the type which develops voltage gradients along a surface thereof in accordance with voltages applied to spaced points thereon; means for developing voltage gradients on said surface in accordance with barometric pressure readings in a geographical area; means for scanning said surface to obtain a time varying signal indicative of said pressure readings, point-to-point; and means for differentiating said time varying signal.

8. In a weather forecasting system, a cathode ray tube having a target formed of a substance of the type which develops voltage gradients along a surface thereof in accordance with voltages applied to spaced points thereon; a plurality of spaced terminals connected to said target and extending out of said tube to which voltages may be applied for developing voltage gradients on said surface in accordance with barometric pressure readings in a given geographical area; means for scanning said electron beam over said surface first in one direction and then in another direction substantially at 90° to the first direction; an electrical circuit connected to said target for producing a time varying signal in accordance with the charge deposited on the target by the electron beam as it scans across said surface, and means connected to said last-named circuit for obtaining the partial derivatives of said time varying signal.

9. In a weather system, a substance of the type which develops voltage gradients along a surface thereof in accordance with voltages applied to spaced points thereon; means for developing voltage gradients on said surface in accordance with given weather parameter readings in a geographical area; and means for scanning said surface to obtain a time varying signal indicative of the amplitude of said parameter, point-to-point.

10. In a weather system, a substance of the type which develops voltage gradients along a surface thereof in accordance with voltages applied to spaced points thereon; means for developing voltage gradients on said surface in accordance with given weather parameter readings in a geographical area; means for scanning said surface to obtain a time varying signal indicative of the amplitude of said parameter, point-to-point; and means responsive to said time varying signal for producing a visual display of said time varying signal.

11. In the system as set forth in claim 9, said last-named means comprising a cathode ray tube indicator, means for deflecting the beam of said indicator, and means for intensity modulating said beam in accordance with said time varying signal.

12. In a weather system, a layer of semiconductor material, means for applying voltages to spaced points on said layer indicative of the values of a weather parameter at corresponding points in a geographical area, whereby voltage gradients develop along a surface of said semiconductor corresponding to the gradients of said weather parameter; and means for scanning said surface to obtain a time varying signal indicative of the amplitude of said parameter, point-to-point.

13. In a system as set forth in claim 12, said semiconductor layer comprising the target of a cathode ray tube, and said means for scanning said surface comprising means for deflecting the electron beam of said tube across said surface.

References Cited in the file of this patent
UNITED STATES PATENTS

| | | |
|---|---|---|
| 1,769,060 | Hendry | July 1, 1930 |
| 1,844,770 | Jiminez | Feb. 9, 1932 |
| 1,907,124 | Ruben | May 2, 1933 |
| 2,412,467 | Morton | Dec. 10, 1946 |
| 2,773,992 | Ullery | Dec. 11, 1956 |
| 2,816,236 | Rosen | Dec. 10, 1957 |
| 2,843,773 | Wardley | July 15, 1958 |
| 2,844,722 | Hines | July 22, 1958 |
| 2,850,657 | McNaney | Sept. 2, 1958 |
| 2,875,350 | Orthuber et al. | Feb. 24, 1959 |
| 2,905,849 | Kazan | Sept. 22, 1959 |